United States Patent [19]

Carpenter

[11] 4,202,205
[45] May 13, 1980

[54] INTEGRAL TORQUER FOR MASS MEASUREMENT SYSTEM

[75] Inventor: David A. Carpenter, Parkton, Md.

[73] Assignee: MRC Corporation, Hunt Valley, Md.

[21] Appl. No.: 909,638

[22] Filed: May 26, 1978

[51] Int. Cl.² ............................................. G01M 1/16
[52] U.S. Cl. ........................................ 73/65; 73/1 D
[58] Field of Search ............... 73/1 D, 1 DC, 65, 460, 73/459, 462–466

[56] References Cited

U.S. PATENT DOCUMENTS

| | | | |
|---|---|---|---|
| 3,036,467 | 5/1962 | McWhorter | 73/459 |
| 3,040,563 | 6/1962 | Eckles et al. | 73/460 X |
| 3,203,224 | 8/1965 | Aske | 73/1 D |
| 3,313,139 | 4/1967 | Caumartin | 73/1 DC |
| 3,583,205 | 6/1971 | Erle | 73/1 D |

Primary Examiner—Charles A. Ruehl
Attorney, Agent, or Firm—LeBlanc, Nolan, Shur & Nies

[57] ABSTRACT

A mass properties measurement system including a test object support table mounted to a bearing means for supporting the table for rotation about an axis of rotation substantially perpendicular to the plane of the support table; means for measuring overturning forces imparted to the measurement table and bearing means by a test object mounted to the support table, wherein the overturning forces tend to rotate the table and bearing means about a pivot axis substantially perpendicular to and intersecting the axis of rotation; induction motor drive means for inducing rotational forces to said support table and bearing means to rotate said support table and bearing means at a predetermined rate of rotation while remaining substantially invisible to said measuring means, the induction motor being mounted to the mass properties measurement system such that substantially all forces imparted to the system by the motor for rotating the table lie in a plane which is substantially perpendicular to said axis of rotation and which contains said pivot axis; and closed loop velocity control means for controllably driving the induction motor to drive the support table up or down to a predetermined rotational speed and to thereafter maintain the table of rotation at said predetermined speed.

10 Claims, 6 Drawing Figures

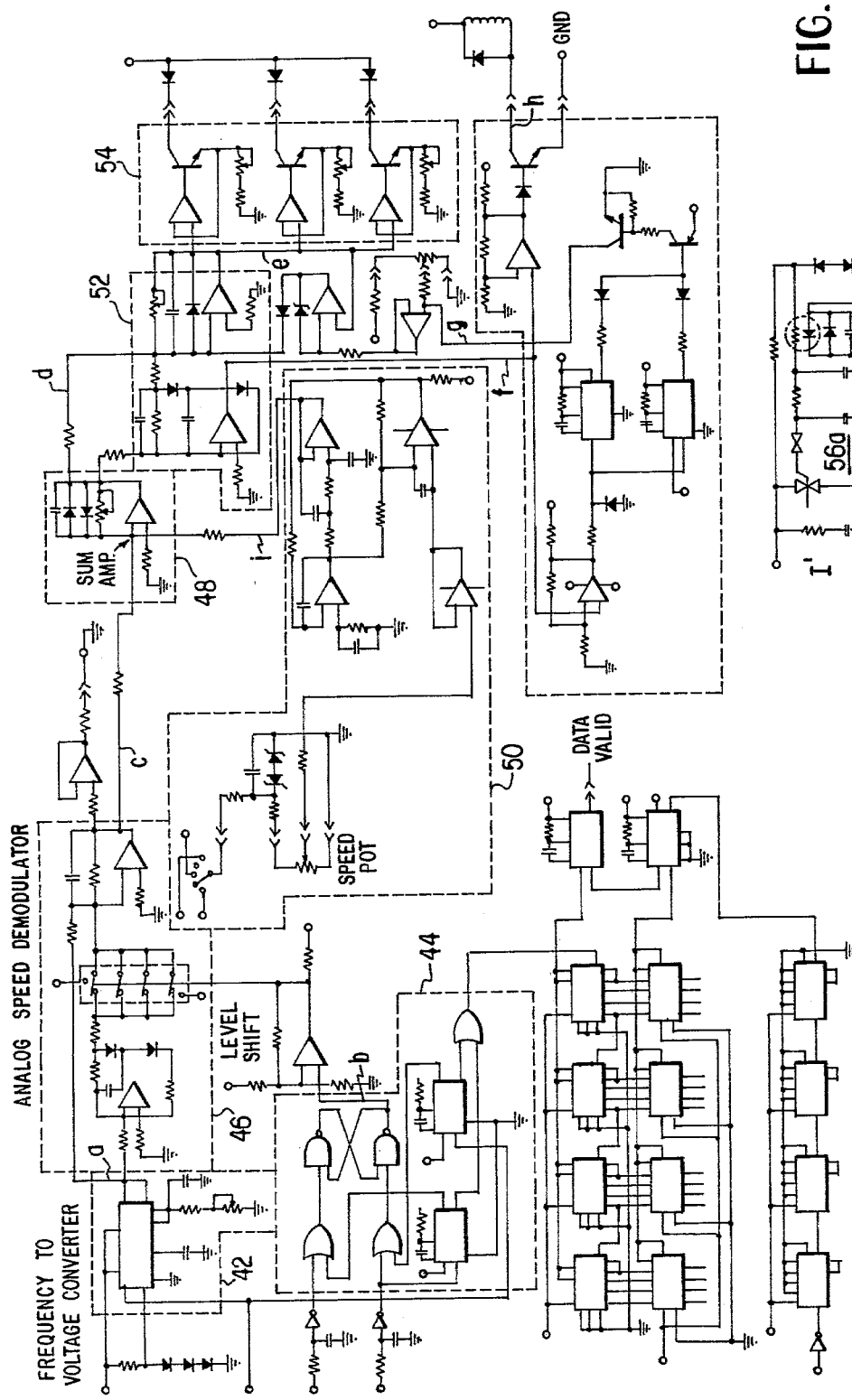
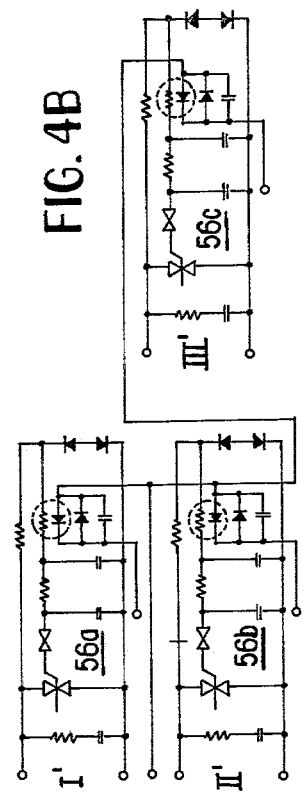
FIG. 4A
FIG. 4B

INTEGRAL TORQUER FOR MASS MEASUREMENT SYSTEM

BACKGROUND OF THE INVENTION

This invention relates to mass properties measurement systems. More particularly, it relates to a controlled drive for controllably driving a mass properties measurement system in rotation.

The inertial properties of a body depend on its mass and mass distribution. Measurements of these properties allow the engineer to determine the principal axes, moments and products of inertia so as to predict its behavior under free body or driven (constrained) motion. Especially in the area of spacecraft development and construction, it has become increasingly important to accurately determine the inertial properties of the spacecraft and its payload.

Current trends in spacecraft design are toward non-rigid construction. The distributed mass properties are not constant and therefore require measuring the dynamic characteristics versus frequency. Some of such measurements, e.g., the determination of products of inertia, require that measurements be made while the object is rotating at a constant speed. With the payload mounted on a vertical dynamic balancing machine, for example, rotation of the load permits measurement of the moments reacting on the spindle bearings.

One such mass properties measurement system is described in Carpenter, David A., "Instrumental Gas Bearings Provide A Test Bed For High Accuracy Inertia (Moments & Products) Measurements", SAWE Paper No. 113, Index Category No. 6.0, presented at the 35th Annual Conference of the Society of Allied Weight Engineers, Inc., Philadelphia, Pa., May 24–26, 1976 (hereafter the "Carpenter paper"); the disclosure of the Carpenter paper is incorporated herein by reference thereto.

Heretofore known systems have utilized arrangements such as a DC motor driving the object and measurement table through, e.g., a belt drive and magnetic clutch arrangement. One such mechanism is described in McCullough, Clarence H. "A Method Of Automated Dynamic Balancing", Paper No. 719, presented at the 27th Annual Conference of the Society of Aeronautical Weight Engineers, Inc. at New Orleans, La., May 13–16, 1968 (hereafter the "McCullough paper"); the disclosure of the McCullough paper is incorporated herein by reference thereto.

In addition to being bulky and complex, such previously known drive systems also had a tendency to impart extraneous forces to the system, thereby reducing the accuracy of measurements made on the test object. It was also difficult to maintain the accuracy and constancy of the speed of such systems.

It is a principal object of the present invention to overcome such disadvantages of heretofore known drive systems.

It is a further object of the invention to provide a mechanism for rotatably driving a mass properties measurement system whereby the drive system is and remains substantially invisible to the measurement system.

It is a still further object of the invention to provide a mechanism for rotatably driving a mass properties measurement system in which the drive mechanism can accurately maintain and/or adjust the rotational speed of the measurement system such that during said maintenance and/or adjustment periods, the drive mechanism remains substantially invisible to the measurement system.

SUMMARY OF THE INVENTION

The invention comprises an induction motor or torquer in which a ring-shaped rotor winding is fixed for rotation with the measurement system and a substantially ring-shaped stator winding is located adjacent the rotor winding and concentric thereto. A principal feature of the invention resides in the fact that the induction motor or torquer is located such that forces imparted thereto by the measurement system are substantially contained in a plane which passes through the pivot center of the measurement table system and particularly the bearing supporting the measurement table. By virtue of such location, the torquer can drive the measurement assembly while remaining substantially invisible to the measuring devices, such as load cells. The torquer is particularly useful with gas bearing measurement systems of the type described in the Carpenter paper and, with some modification, of the type described in the present inventor's commonly assigned copending application Ser. No. 887,606, filed Mar. 17, 1978, entitled MASS PROPERTIES MEASUREMENT SYSTEM.

The invention further comprises an electronic drive control system which allows the torquer to operate as a closed (velocity) loop servo. In operation, the torquer applies an operator-selected torque rate to bring the measurement table and shaft up to the desired measurement speed. Upon reaching that speed, the drive control circuit causes input power to drop off to a fraction of the acceleration power. Only enough power is maintained on the motor to cause constant speed operation against windage effects of the object being measured. In addition, torque rate can be adjusted by the operator during operation to appropriately accelerate or decelerate the measurement table up or down to its new desired rotational speed.

Further objects and features of the invention will be made clear from the following description of the preferred embodiment.

BRIEF DESCRIPTION OF THE DRAWINGS

FIG. 4A is a detailed circuit diagram of the motor control system of FIG. 3; and FIG. 4B is a detailed circuit diagram of the triac drive control.

DESCRIPTION OF THE PREFERRED EMBODIMENT

Figure 1:
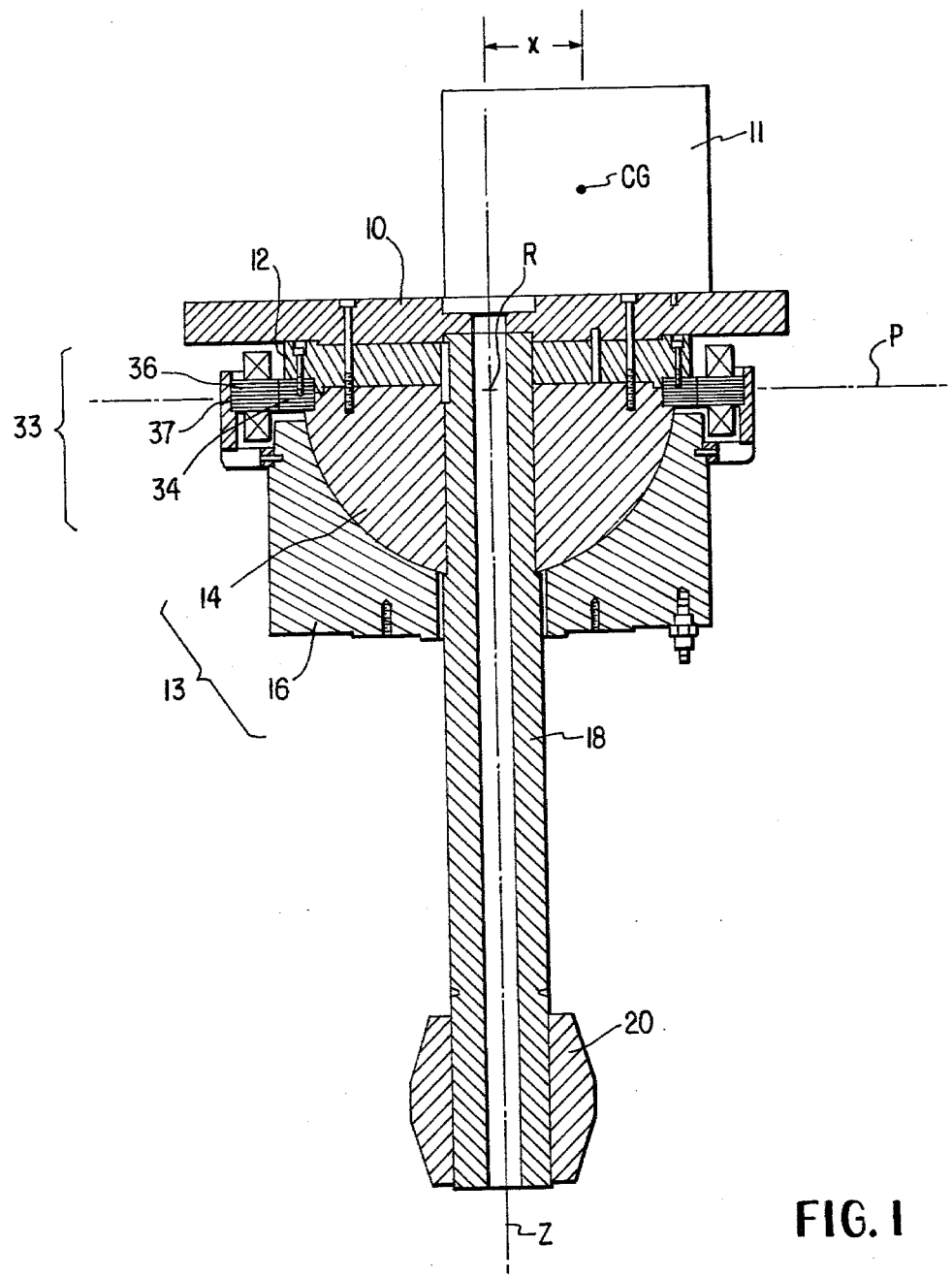
FIG. 1 is a sectional elevation of the measurement table and associated bearing support and motor drive systems.
Figure 2:
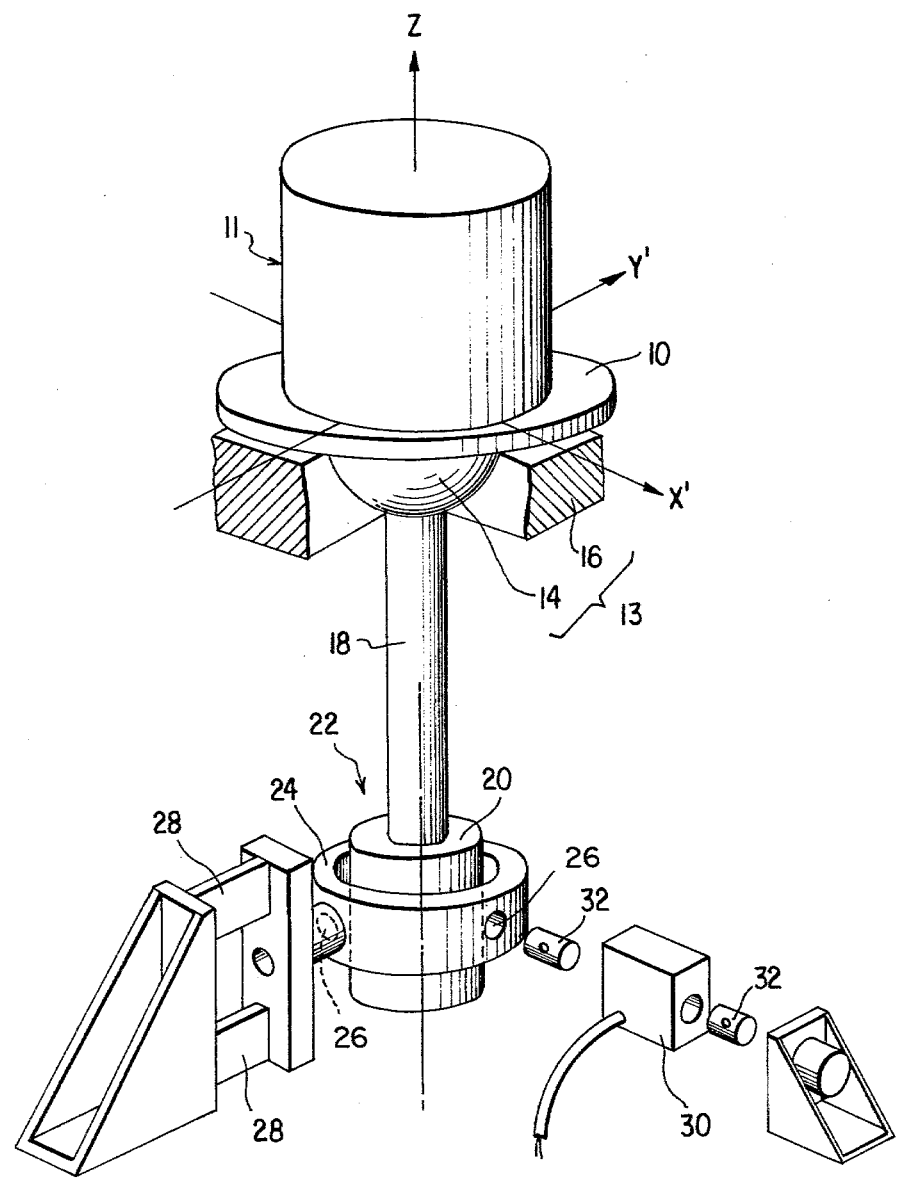
FIG. 2 is a partially cut-away, partially exploded perspective view of the measurement table bearing mounting assembly.

In one preferred exemplary embodiment, the mass properties measurement system includes a circular support table 10 having a substantially planar surface on which a payload 11 to be measured may be mounted. A circular adapter plate 12 is advantageously secured to the underside of the measurement table 10 concentrically therewith. Adapter plate 12 in turn is secured to a bearing 13 which permits primarily rotational movement about an axis Z coincident with the centers of table 10 and plate 12. For example, plate 12 may be secured to the planar face of a hemispherical bearing journal 14 which rests in the machined bowl of a bearing socket 16. Together, journal 14 and socket 16 advantageously form a gas bearing. Alternatively, table 10 may be secured directly to bearing journal 14 and adapter plate 12 eliminated.

A shaft 18 extends through central axial openings in socket 16, journal 14, adapter plate 12 and table 10. One end of shaft 18 is rigidly secured to table 10, adapter plate 12 and journal 14; the opposite end portion of shaft 18 has a substantially cylindrical bearing journal 20 secured thereto which rests in a lower bearing support in such a way that the entire assembly shown in FIG. 1 is limited to a single degree of freedom: rotation about the longitudinal axis (i.e., the Z axis) of the shaft 18.

The lower cylindrical bearing journal 20 comprises part of a cylindrical gas bearing 22 which includes gimbal ring 24 and gimbal bearings 26 (e.g. four such bearings located 90° apart around the circumference of gimbal ring 24). The weight of the lower cylindrical bearing assembly 22 is supported by a set of mono-flexures 28. A load cell 30 is mounted by universal flexure members 32 to the gimbal ring 24 at right angles to the monoflexure 28. The mono-flexures provide high stiffness to motion perpendicular to a plane containing the Z axis and the load cell; also, the mono-flexures 28 allow substantial freedom of motion of the lower bearing along the load cell axis. Movement of the bearing assembly 22 in the plane containing the load cell and the Z axis is restrained only by the load cell; such plane is therefore called the measurement plane. Data obtained from load cell measurements is used to determine e.g., products of inertia, center of gravity, etc. of the payload 11; such measurement techniques are known and form no part of the present invention. The bearing assembly thus far described is conventional and has been used by MRC Corporation, (assignee of this application) in previous mass properties measurement systems, such as the Model Mark II.

The bearing assembly of this invention comprises, in addition to the aforementioned elements, an induction motor drive (or torquer) 33 comprising a rotor winding 34 rigidly fixed to the undersie of circular adapter plate 12 at its rim, and/or to the journal 14. It is advantageous and desirable that the vertical center of the rotor winding 34 lie in or close to a plane P substantially parallel to the planar face of journal 14 and containing the center of radius R of journal 14. A stator winding 36 is secured to the bearing socket 16 by means of, for example, a support bracket assembly 37. Stator winding 36 is located adjacent rotor winding 34 and is separated therefrom by a small air gap; it is advantageous and desirable that the vertical center of stator winding 36 also lie in or close to plane P. Both the rotor winding 34 and stator winding 36 are ring shaped to conform with the shape of bearing journal 14.

Rotor 34 and stator 36 together comprise a three-phase induction motor or torquer having a high slip capability; preferably, the induction motor is of such design that it can run with a locked rotor without overheating for extended periods of time.

Z axis data (angular position and speed) is provided by a photoelectric pick-up disc 38 mounted concentrically on the shaft 18 between bearings 13 and 22. A phototransducer assembly 40 is mounted on the stationary portion of the measurement system assembly to detect, among other things, the rotational speed and direction of the measurement table 10.

It will be seen from the preceding description of the mechanical construction of the mass properties measurement system of this invention, that the measurement table and its support assembly, including bearing journals 14 and 20 and stabilizing shaft 18, are physically independent of the drive and detector systems. Thus, the measurement table can be considered as a free-floating object mounted to a substantially friction-free rotatable spindle. Significantly, this invention provides a drive system for driving the shaft and measurement table in rotation and for adjusting the speed of rotation thereof during the course of a measurement cycle without bringing the drive system into physical contact with the measurement table or support spindle and at the same time maintaining the drive system substantially invisible to the load cell measurement system.

This latter characteristic of the invention is obtained by physically locating the torquer windings or rings 34 and 36 in a plane containing the center of radius R of bearing journal 14. By so locating the torquer rings, lateral forces imparted to the measurement table assembly by the torquer pass through the pivot center of the bearing assembly 13.

Referring to FIG. 1, assume that payload 11 is mounted to the measurement table 10 such that its center of gravity CG is offset from the rotational axis Z a distance "X". The moment arm X generates an overturning force tending to rotate the measurement system assembly, including table 10, journal 14 and shaft 18, about pivot point R. Pivot point R may be considered as the point of interaction of rotational axis Z and a pivot axis substantially perpendicular thereto. The resultant of this overturning force in the measurement plane is measured by the load cell 30 in a known manner.

Because substantially all physical forces imparted to the measurement table system assembly by the torquer are limited to a plane substantially perpendicular to the rotational axis Z passing through the pivot center R, the torquer remains essentially invisible to the load cell measurement system while driving the system in rotation.

Figures 3, 3A:
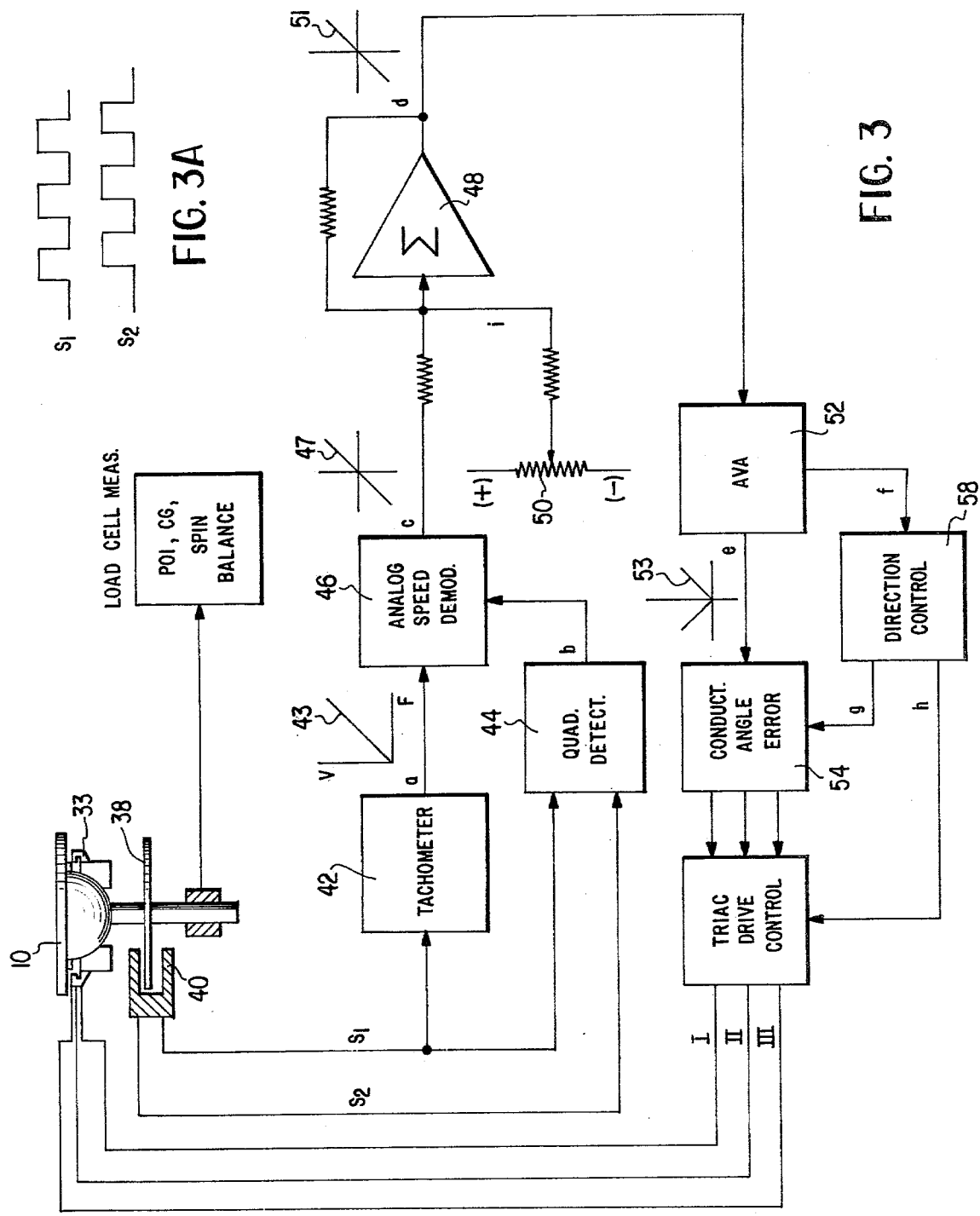
FIG. 3 is a block diagram of the closed velocity loop induction motor control system.
FIG. 3A is a waveform diagram showing a typical quadrature relationship of the phototransducer output signals.

FIGS. 3 and 4A-B show the electronic drive control system of this invention which allows the torquer to operate as a closed (velocity) loop servo. In operation, the torquer applies the user selected torque rate to bring the shaft up to the desired measurement speed. Upon reaching that speed, the input power to the torquer automatically drops off to a fraction of the acceleration power. Only enough power remains on the motor to cause constant speed operation against windage effect of the payload. The system can be reversed to take measurements in the opposite rotation sense in order to average unsymmetrical wind loading.

The phototransducer assembly 40 generates a pair of output signals $S_1$ and $S_2$ in quadrature phase relationship (i.e., signals $S_1$ and $S_2$ are 90° out of phase with each other). The specific phase relationship of signals $S_{1\,L\,and}$ $S_2$ is a function of the rotational direction of the shaft 18 and photo pick-up disc 38.

Output signals $S_1$ and $S_2$ from transducer 40 are supplied to the input of the motor drive circuit shown in block form in FIG. 3. This circuit controls the induction motor through a rate feedback signal derived from the transducer outputs and an operator-selected set point speed so that the ultimate result is to provide a motor r.p.m. which tracks the operator-selected set point speed.

Phototransducer signal $S_1$ is applied to the input of a frequency-to-voltage convertor or tachometer 42. The output a of tachometer 42 is a DC signal 43 which is proportional to frequency and thus to the rotational speed of shaft 18. Transducer output signals $S_1$ and $S_2$ are applied to respective inputs of a quadrature detector 44 which detects the direction of rotation of the photo pick-up disc 38 and shaft 18. The output b of quadrature detector 44 is a switching signal which is applied to one input of an analog speed demodulator, or switched absolute value amplifier (AVA) 46; the output a of tachometer 42 is applied to a second input of the speed demodulator 46. The output c of speed demodulator 46 is an unambiguous DC signal 47 proportional to the rotational speed of shaft 18; output c is positive when the shaft is rotating in the clockwise direction and is switched negative when the rotation direction changes from clockwise to counterclockwise.

A summing amplifier 48 combines the demodulator output c with a set point signal i which is set by the operator on a speed control potentiometer 50. The output d of the summing amplifier 48 is an error signal 51; as long as the output voltage of the analog speed demodulator 46 is equivalent to the DC set point signal i (i.e., when the shaft 18 is rotating at the speed set by the operator), a zero error signal is generated at the output d of summing amplifier 48.

If, during a measurement operation, the operator changes the set point speed i, an error signal d will be generated at the output of summing amplifier 48. In the disclosed embodiment, this error signal d will be positive if the operator increases the set point speed and negative if the operator decreases the set point speed. (It should be noted that the direction of signals described herein is exemplary only; by means of relatively simple circuit modifications, signals having the opposite sense can be generated.)

The error signal d is applied to the input of an absolute value amplifier 52. A DC signal 53 is generated at output e of AVA 52 which is applied to one input of a conduction angle control circuit 54. The output of conduction angle control circuit 54 comprises three control signals which are applied to respective inputs of a triac drive control circuit 56 for separately controlling the power to each phase of the three-phase induction motor. The block 54 controls the conduction angle or conduction time of the triacs in each phase as a function of the error signal d. Specifically, the conduction angle is directly proportional to AVA output signal e which consists of the absolute value of error signal d.

A second output f of AVA 52 is applied to the input of a direction control circuit 58; one output g of direction control circuit 58 forces the conduction angle of the triac drive control circuit 56 to zero whenever a direction reversal is required, e.g. when the shaft 18 is rotating too fast and is required to slow down, calling for a phase reversal, the direction control circuit 58 detects this change in direction and forces the conduction angle to zero for a predetermined period, (e.g. about 20 milliseconds) and then re-enables the conduction angle control circuit 54 to control the conduction angle of the triac drive 56.

In a three-phase induction motor of the type contemplated for this invention, direction reversal is accomplished by reversing any two of the three leads in the three-phase circuit. Referring to FIG. 3, the output of triac drive control block 56 comprises three leads, designated I, II, III, respectively; these leads are normally connected internally in block 56 to the triac drive control circuits 56a, 56b, 56c, respectively, shown in FIG. 4B. A double-pole-double-throw reversing relay switch 60 (of which only the coil is shown in FIG. 4A), is connected to two of the three phases (e.g. to phases I and II). When a cross-over from positive to negative or vice-versa is detected at direction control circuit input f, relay 60 is triggered to reverse the connections between triac drive control circuits 56a, 56b and induction motor leads I and II.

The relay contacts carry the full drive current (e.g., 30 amps). In order to prevent arcing during switchover which could result in damage to the relay contacts, particularly during contact closure, direction control circuit 58 generates lock-out signal g; as noted above, this signal is applied to the conduction angle control circuit 54 to force the triac conduction angle to zero for a predetermined period which overlaps the relay switchover time. Thus, when the triac conduction angle is forced to zero, no current flows to the torquer windings. This permits the relay contacts to be switched under zero power conditions to avoid arcing of and possible damage to the contacts, especially during contact closure.

The detailed circuit diagram shown in FIGS. 4A–4B is exemplary only. It would be apparent to one skilled in the art that other specific circuit designs can be used to accomplish the same or equivalent functions described above with respect to the block diagram of FIG. 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. A mass properties measurement system, comprising:
   a substantially planar test object support table;
   bearing means for supporting said table for rotation about an axis of rotation substantially perpendicular to the plane of the support table;
   means mounting said bearing means and support table to a static support to permit movement of said bearing means and support table about a pivot axis substantially perpendicular to and intersecting said axis of rotation;
   means for measuring overturning forces imparted to the support table and bearing means by a test object mounted to the support table, said overturning forces tending to rotate the table and bearing means about said pivot axis; and
   drive means for inducing rotational forces to said support table and bearing means to rotate said support table and bearing means at a predetermined rate of rotation while remaining substantially invisible to said measuring means, said drive means comprising an induction motor mounted to the mass properties measurement system and having substantially ring-shaped stator and rotor windings coupled to said static support and table, respectively, said windings lying in a plane which contains said pivot axis and is substantially perpendicular to said axis of rotation.

2. A measurement system according to claim 1, wherein said bearing means comprises a hemispherical movable bearing journal which seats in the machined bowl of a fixed bearing socket, said journal having a substantially planar face to which said support table is secured and wherein said pivot axis lies substantially in the plane of the journal face; one of said induction motor windings being mounted to said bearing journal substantially in the plane of the journal face, and the other of said induction motor windings being mounted to said bearing socket substantially in the plane of the journal face.

3. A mass properties measurement system, comprising:
a substantially planar test object support table;
bearing means for supporting said table for rotation about an axis of rotation substantially perpendicular to the plane of the support table, said bearing means comprising a part spherical movable bearing journal which seats in a complementary shaped fixed bearing socket, said journal having a substantially planar face to which said support table is secured, said bearing means and support table having a pivot axis lying substantially in the plane of said journal face and substantially perpendicular to and intersecting said axis of rotation;
means for measuring overturning forces imparted to the support table and bearing means by a test object mounted to the support table in such a manner that said overturning forces tend to rotate the table and bearing means about said pivot axis; and
drive means for inducing rotational forces to said support table and bearing means to rotate said support table and bearing means at a predetermined rate of rotation while remaining substantially invisible to said measuring means, said drive means comprising an induction motor mounted to the mass properties measurement system and having a first winding mounted to said bearing journal substantially in the plane of the journal face, and a second winding mounted to said bearing socket substantially in the plane of the journal face.

4. A system according to claim 1 or 3, wherein said windings are substantially concentric with each other with the centers of said windings being substantially coincident with said axis of rotation.

5. A system according to claim 1 or 3, further comprising:
a support shaft having one end portion secured to said support table and said bearing means such that the longitudinal axis of said shaft is substantially coincident with said axis of rotation; and
further bearing means substantially securing said shaft against movement except rotational movement about said axis of rotation.

6. A system according to claim 1 or 3, further comprising closed loop velocity control means for controllably driving said induction motor to drive said support table up or down to a predetermined rotational speed and to thereafter maintain the table of rotation at said predetermined speed.

7. A measurement system according to claim 6, wherein said control means comprises:
detector means for detecting the rotational speed and direction of rotation of said support table;
analog speed demodulator means for generating an analog signal representative of said rotational speed and direction of rotation;
means for combining said analog signal with a predetermined speed signal and generating an error signal proportional to the difference therebetween; and
means for controlling power to said induction motor as a function of said error signal.

8. A measurement system according to claim 6, wherein said control means comprises:
detector means for detecting the rotational speed and direction of rotation of the support table;
tachometer means coupled to said detector means for generating a first speed related signal;
direction means coupled to said detector means for generating a direction related signal;
analog speed demodulator means coupled to said tachometer means and direction means for generating an analog signal representing the speed and direction of rotation of the support table;
set point means for generating a set point signal representing a desired speed and direction of rotation of the support table;
summation means for summing said analog signal and set point signal and for generating an error signal based thereon;
amplifier means for amplifying the absolute value of said error signal;
direction control means for detecting the direction of rotation represented by said error signal and for generating a desired direction signal;
induction motor drive control means for controlling power to the induction motor; and
means applying the absolute value of the error signal and the desired direction signal to the induction motor drive control means for controlling the amount and direction of power supplied to the induction motor as a function of said error signal absolute value and desired direction signal.

9. A measurement system according to claim 8, wherein said induction motor comprises a three-phase motor; and said induction motor drive control means comprises means for separately controlling power supplied to each phase of said motor as a function of said error signal absolute value, and means for reversing two phases to thereby reverse the direction of rotation of the motor as a function of said desired direction signal.

10. A measurement system according to claim 9, further comprising: means for cutting off power supplied during the transition period of reversal of said two phases.

* * * * *